(12) United States Patent
Tsai et al.

(10) Patent No.: US 7,599,796 B2
(45) Date of Patent: Oct. 6, 2009

(54) DUAL-MODE LOCATION POSITION SYSTEM

(75) Inventors: Ting-Yi Tsai, Taipei (TW); Kuen-Ruey Lu, Hsinchu (TW); I-Ru Liu, Taipei (TW); Te-Yao Liu, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 555 days.

(21) Appl. No.: 11/382,833

(22) Filed: May 11, 2006

(65) Prior Publication Data
US 2007/0265775 A1  Nov. 15, 2007

(51) Int. Cl.
*G01C 21/00* (2006.01)
(52) U.S. Cl. .................. 701/215; 701/214; 342/357.06; 342/358
(58) Field of Classification Search ........................ None
See application file for complete search history.

(56) References Cited

U.S. PATENT DOCUMENTS

| | | | | |
|---|---|---|---|---|
| 6,427,120 B1 * | 7/2002 | Garin et al. | ................. | 701/213 |
| 6,459,989 B1 * | 10/2002 | Kirkpatrick et al. | ......... | 701/215 |
| 6,707,424 B1 * | 3/2004 | Snyder et al. | .......... | 342/357.14 |
| 6,985,743 B2 * | 1/2006 | Bajikar | ..................... | 455/456.1 |
| 7,170,445 B2 * | 1/2007 | Thiel et al. | ............. | 342/357.06 |
| 7,221,928 B2 * | 5/2007 | Laird et al. | ............... | 455/404.1 |
| 2002/0190896 A1 * | 12/2002 | Tsujimoto et al. | ......... | 342/357.1 |
| 2004/0162084 A1 * | 8/2004 | Wang | ....................... | 455/456.1 |
| 2007/0184851 A1 * | 8/2007 | Barnwell et al. | ......... | 455/456.1 |

* cited by examiner

*Primary Examiner*—Michael J. Zanelli
(74) *Attorney, Agent, or Firm*—Kusner & Jaffe

(57) ABSTRACT

The dual mode positioning system comprises multiple wireless network devices, one of the multiple wireless network devices including a GPS receiver. DSS is coupled to the multiple wireless network devices and an operation mode switch is also coupled to the multiple wireless network devices including a GPS receiver. A satellite GPS receiver coupled to the operation mode switch. The satellite GPS receiver is operated in an indoor area confined by walls with wide FOV (field of view) glass window, the operation mode switch switching to GPS mode for the satellite GPS receiver receives signals from greater than 3 satellites. Moreover, the satellite GPS receiver is operated in an indoor area confined by concrete walls or walls with narrow FOV glass window, the operation mode switch switching to Joint GPS/WPS mode for the satellite GPS receiver cannot receive signals from greater than 3 satellites.

20 Claims, 7 Drawing Sheets

DUAL-MODE LOCATION POSITION SYSTEM

FIELD OF THE INVENTION

The invention relates to a location positioning system, and more specifically, to a dual mode location positioning system.

BACKGROUND OF THE INVENTION

Description of the Prior Art

With the rise of chip and communication technology, many devices are getting smaller with higher capabilities. In addition, the advance of mobile technology allows increased portability of various devices. The functions of the cellular phone also have been increasing, with some services now supporting Internet access through the cellular phone. Tracking of vehicles such as automobiles and trucks is known. For example, a global positioning system (GPS) is introduced to position a mobile vehicle via a wireless network at regular intervals to a centrally located base station to track the vehicles.

GPS receivers receive satellite positioning signals from a set of up to 32 satellites deployed in 12-hour orbits about earth. Each GPS satellite continuously transmits two spread spectra. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P-code (Y-code) is reserved for military uses.

A conventional global positioning system (GPS) device provides positional information about the location of the UPS device by receiving and processing GPS band signals from a GPS system including satellites and base stations. The location of the individual with the locator device is obtained when a subscriber requests the individual's location through a location service provider. The personal locator device communicates its location to the location service provider, and the information about the location of the individual is communicated to the subscriber.

Nowadays, there are various position system, for instance, Global location systems (INS or GPS, for examples), wide-area location systems based on cellular networks and indoor location systems (Multi-sensor Integrated System or WPS, for examples). The user may select the proper system to fit his/her requirement. The term INS refers to Inertial Navigation System and GPS stands for Global Positioning System. The Multi-sensor Integrated System is an indoor location system by WLAN or RFID. WPS, stands for WLAN Positioning System, is a wireless local-area network (WLAN) radio-signal-based positioning system which generally relies on the collecting of WLAN signals to train the signal-distribution map, thus applying a position-determination model that can be used to determine the location of mobile devices.

The conventional method uses 3-D Global Positioning System only. It fails to provide GPS data when GPS is operated in an indoor area confined by concrete walls, barriers or materials. In such case, GPS receiver cannot receive signals from any satellites with respective UPS transmitter. Furthermore, it may provide non-accurate GPS data when GPS is operated in an indoor area confined by walls with a narrow FOV glass window. In this case, GPS receiver cannot receive signals from greater than 3 satellites with respective GPS transmitter.

In view of the aforementioned, what is required is to provide a novel system with dual mode which may be operated indoor.

SUMMARY OF THE INVENTION

The main object of the present invention is to disclose a dual mode location positioning system and method.

The dual mode location positioning system comprises multiple wireless or wired network communication devices, one of the multiple network communication devices including a GPS receiver. DSS (Distribution Service System) is coupled to the multiple network communication devices and an operation mode switch is also coupled to the network devices with GPS receiver. A satellite GPS receiver is coupled to the operation mode switch. The satellite UPS receiver is operated in an indoor area confined by walls with wide FOV (field of view) glass window, the operation mode switch switching to GPS mode for the satellite GPS receiver receives signals from greater than 3 satellites. Moreover, the satellite UPS receiver is operated in an indoor area confined by concrete walls with narrow FOV glass window, the operation mode switch switching to Joint GPS/WPS mode for the satellite UPS receiver cannot receive signals from greater than 3 satellites.

The above Joint GPS/WPS mode, the satellite GPS receiver may discard null or degraded GPS position data and replace it by Joint GPS/WPS position data or coordinate degraded GPS position data with Joint GPS/WPS position data in order to improve the accuracy of location positioning. The Joint GPS/WPS position data are obtained by correcting a WPS position data of the satellite GPS receiver relative to the wireless network device having GPS receiver with a known GPS position.

The satellite GPS receiver includes a processing unit to perform the function of GPS positioning, Joint GPS/WPS position request to the wireless network device, comparison and merge of GPS and Joint GPS/WPS positions or location-based service for navigation. The wireless network devices including a GPS receiver also has a processing unit to perform the function of GPS positioning, WPS positioning, Joint GPS/WPS position search and responsive to request of a satellite. Similarly, the DSS may perform the function of WPS positioning, WPS to GPS format translation, Joint GPS/WPS position library update.

Another aspect of the present invention is to provide a method of operation a dual mode positioning system having multiple network communication devices and a satellite GPS receiver coupled to a switch, wherein one of the multiple network communication devices includes a UPS receiver, the method comprising:

switching to UPS mode by the switch for satellite GPS receiver receives signals from a number of satellites; when the GPS satellite receiver is operated in an indoor area confined by walls with wide FOV (field of view) glass window; and switching to Joint GPS/WPS mode by the switch for the satellite GPS receiver cannot receive signals from the number of satellites when the satellite GPS receiver is operated in an indoor area confined by concrete walls with narrow FOV glass window.

The Joint GPS/WPS mode, the satellite GPS receiver may discard null or degraded GPS position data and replace it by Joint GPS/WPS position data or coordinate degraded GPS position data with Joint GPS/WPS position data in order to improve the accuracy of location positioning. The Joint GPS/

WPS position data is obtained by correcting a WPS position data of satellite GPS receiver relative to the wireless network device having UPS receiver.

BRIEF DESCRIPTION OF THE DRAWINGS

For a better understanding of the present invention and to show how it may be carried into effect, reference will now be made to the following drawings, which show the preferred embodiments of the present invention, in which.

DESCRIPTION OF THE PREFERRED EMBODIMENTS

The present invention discloses a novel dual mode global positioning system. In the following description, numerous specific details are set forth in order to provide a thorough understanding of the present invention, and the scope of the present invention is expressly not limited expect as specified in the accompanying claims. One skilled in the relevant art will recognize, however, that the invention may be practiced without one or more of the specific details. In other instances, well known structures, materials, or operations are not shown or described in order to avoid obscuring aspects of the invention.

Those of ordinary skill in the art will immediately realize that the embodiments of the present invention described herein in the context of methods and schematics are illustrative only and are not intended to be in any way limiting. Other embodiments of the present invention will readily suggest themselves to such skilled persons having the benefits of this disclosure.

Figure 1A:
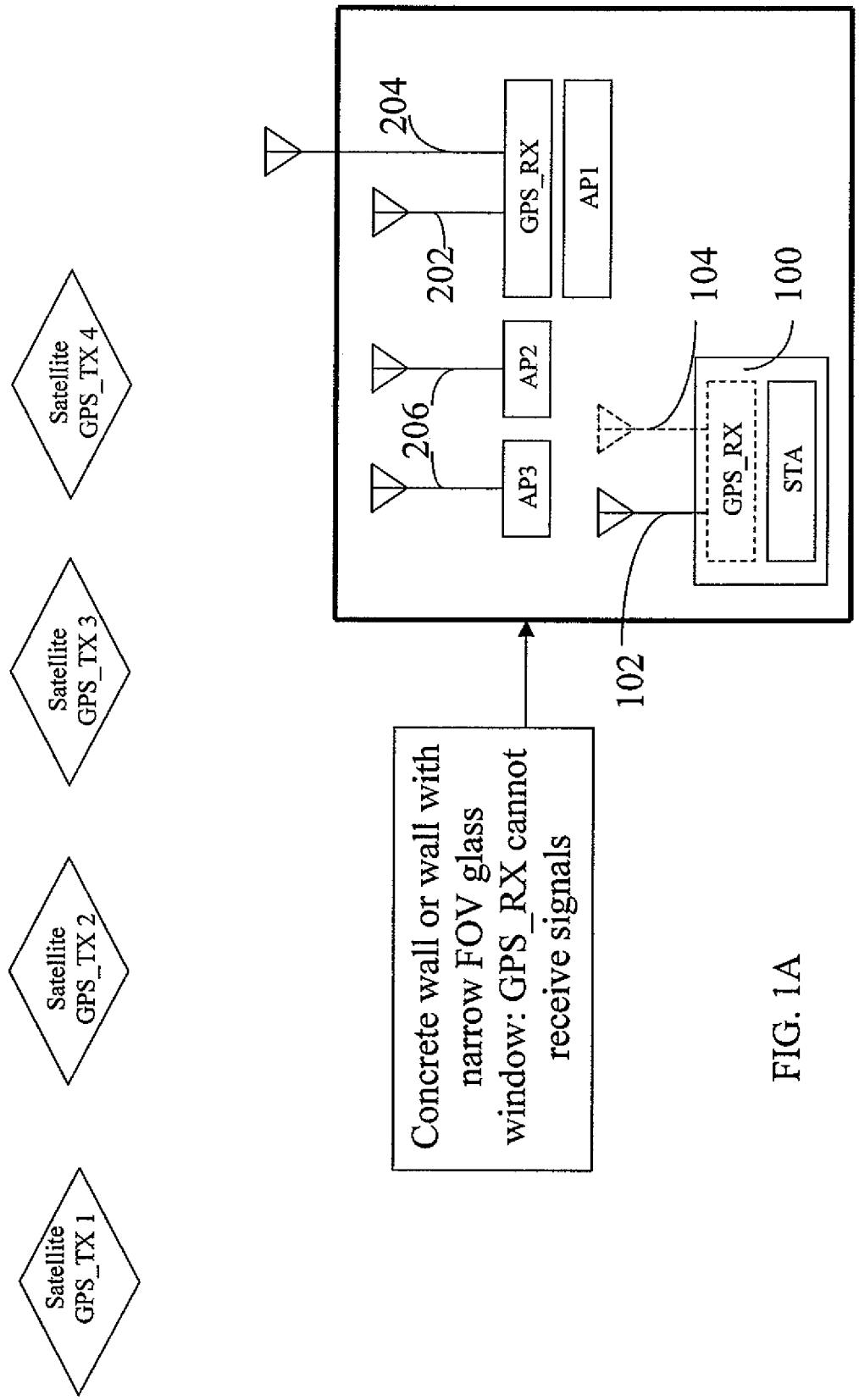
FIG. 1A and FIG. 1B show a dual mode positioning system of the present invention.
Figure 1B:
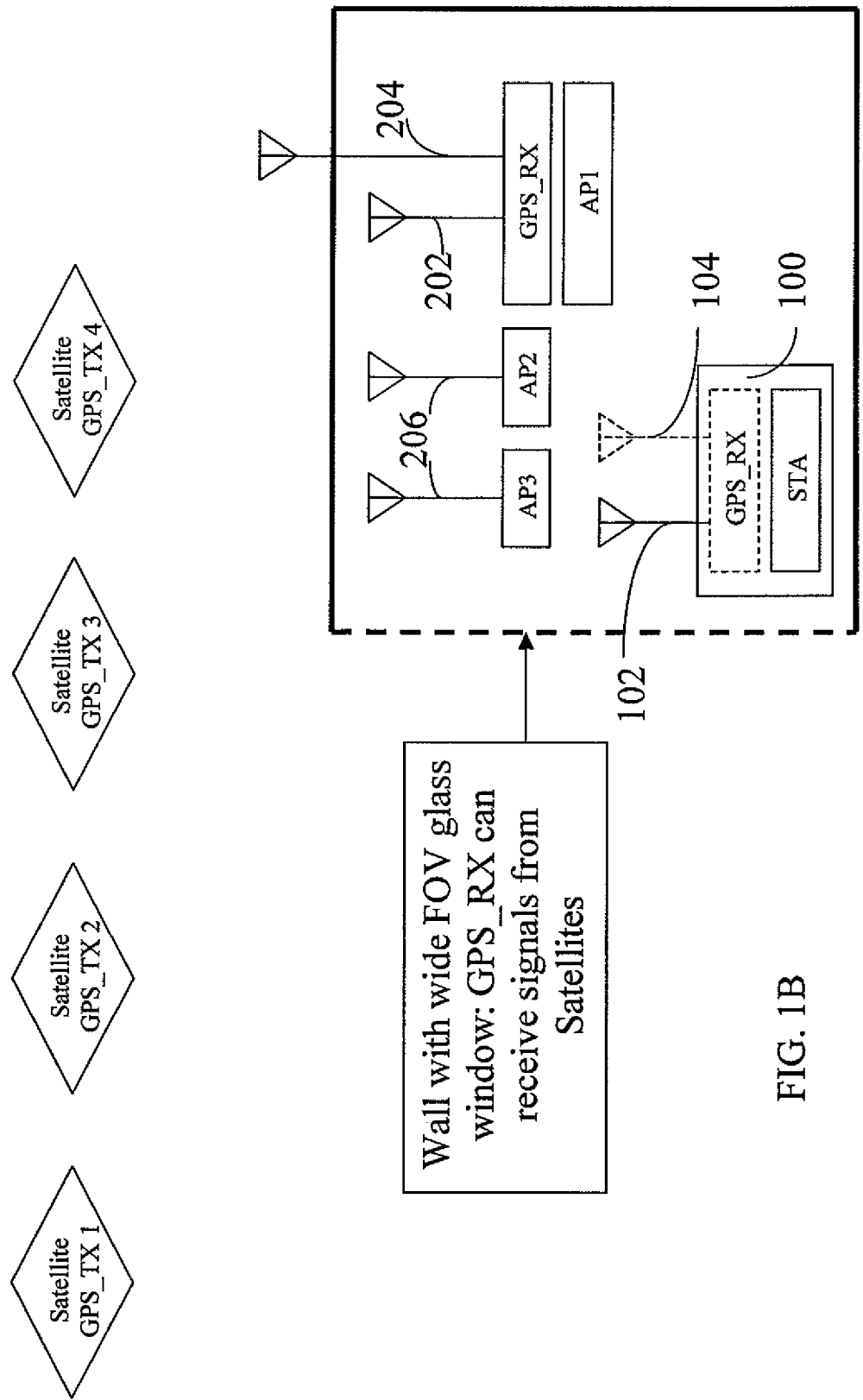

The present invention requires combines 3-D Global Positioning System with 2-D Wireless-LAN Positioning System. Namely, at least 4 Satellite GPS_TXs (transmitter) are required accompany with 3 or 2 access points are necessary. Please refer to FIG. 1A and FIG. 1B, the system includes a satellite GPS receiver 100 with one satellite antenna 102 and one GPS receiver antenna 104. The system further includes at least three wireless or wired network communication device, for instance, AP. In the embodiment, AP1-AP3 are illustrated. One of the AP (namely AP1) has AP antenna 202 and one outdoor GPS receiver antenna 204. Other APs has AP antenna 206 as well.

When satellite UPS receiver (GPS_RX/STA) is operated in an indoor area confined by walls with wide FOV (field of view) glass window. It switches to UPS mode for GPS_RX/STA can receive signals from greater than 3 satellites. When GPS_RX/STA is operated in an indoor area confined by concrete walls with narrow FOV glass window, it switches to Joint GPS/WPS mode for GPS_RX/STA cannot receive signals from greater than 3 satellites. In the Joint UPS/WPS mode, GPS_RX/STA can may discard null or degraded GPS position data and replace it by Joint GPS/WPS position data or coordinate degraded GPS position data with Joint GPS/WPS position data in order to improve the accuracy of location positioning. In addition, the Joint GPS/WPS position data are obtained by correcting a WPS position data of GPS_RX/STA relative to the GPS_RX/AP with a known GPS position from the GPS position data of that GPS_RX/AP. The GPS_RX/AP refers to a wired or wireless network communication device with a GPS receiver.

Figure 2:
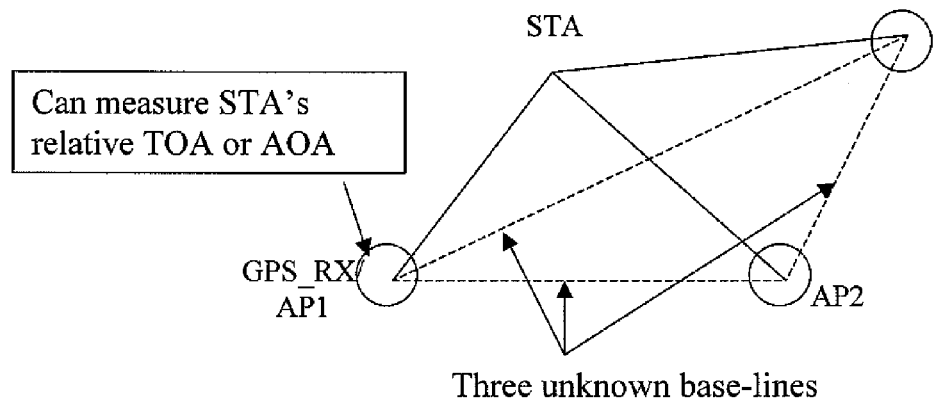
FIG. 2-FIG. 5B show the measure method for the dual mode positioning system of the present invention.

The WPS position can be estimated by solving systems with non-linear hyperbolic equations, non-linear elliptic equations or non-linear sinusoidal equations of triangulation, which can be solved in DSS (Distribution Service System), one of the APs (GPS_RX/AP in most cases) or STA (unusually). Please turn to FIG. 2, the non-linear hyperbolic equations, having the form of Time-Difference-Of-Arrival or Amplitude-Difference-Of-Arrival, are got from at least 3 APs with respective omni-directional antennas. From the FIG. 2, AP3 and AP2 may measure the STA's relative TOA or AOA. The AP1 with GPS_RX can measure STA's relative TOA or AOA and solve three difference or sum equations of norms for hyperbolic (or elliptic) position. Further, non-linear elliptic equations, having the form of Time-Sum-Of-Arrival or Amplitude-Sum-Of-Arrival, are got from at least 3 APs with respective omni-directional antennas. Non-linear sinusoidal equations of triangulation at least utilize 2 measured Direction-Of-Arrival and 1 known Base-Line from two APs, if both APs use direction-finding antennas or if STA and one AP use direction-finding antennas.

If the indoor area has only 1 GPS_RX/AP, then the Wireless-LAN Positioning System can use the only method by having GPS_RX/AP measure DOA and TOA (or AOA) of STA to estimate its relative position in polar coordinates. Similar method can be used in the case that STA has capability to measure DOA and TOA (or AOA) of STA to estimate relative position in polar coordinates of itself. The measured time and log-scale amplitude, corresponding to the distances between APs and between AP and STA, are influenced by multi-path effects. The key method of signal strength distribution can be used to mitigate the multi-path effects when extracting the dominant Time-of-arrival (or Amplitude-of-arrival or Direction-of-arrival) datum from repeated data of TOA (or AOA or DOA). Further, various algorithms of either linearization or iteration can be used as the key methods to solve non-linear equation systems.

Figure 3:
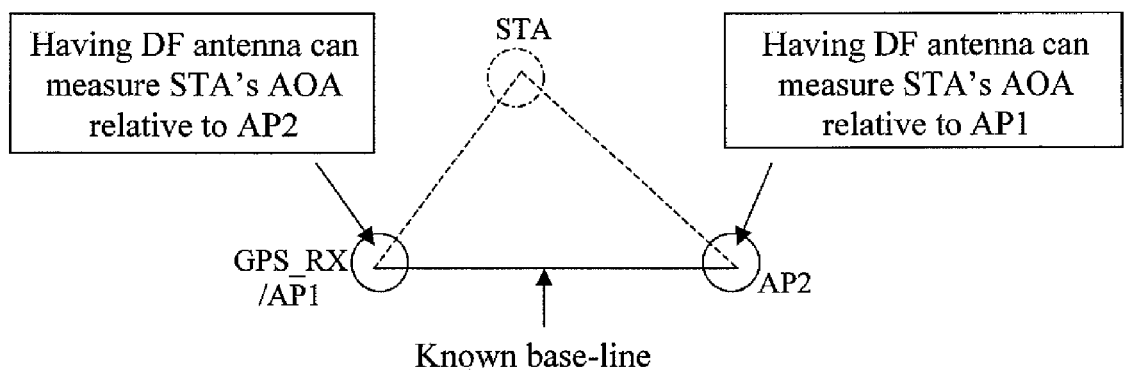

Alternative optional triangulation can be employed to solve the position. Please turning to FIG. 3, two APs (AP1, AP2) are introduced in the system. Both of the APs may have the DF antenna to measure the AOA of the satellite (STA) relative to another AP if the base line between the two APs is known. The AP1 has the GPS_RX to solve two equations of sine and cosine. The position can be estimated by the system.

Figure 4:
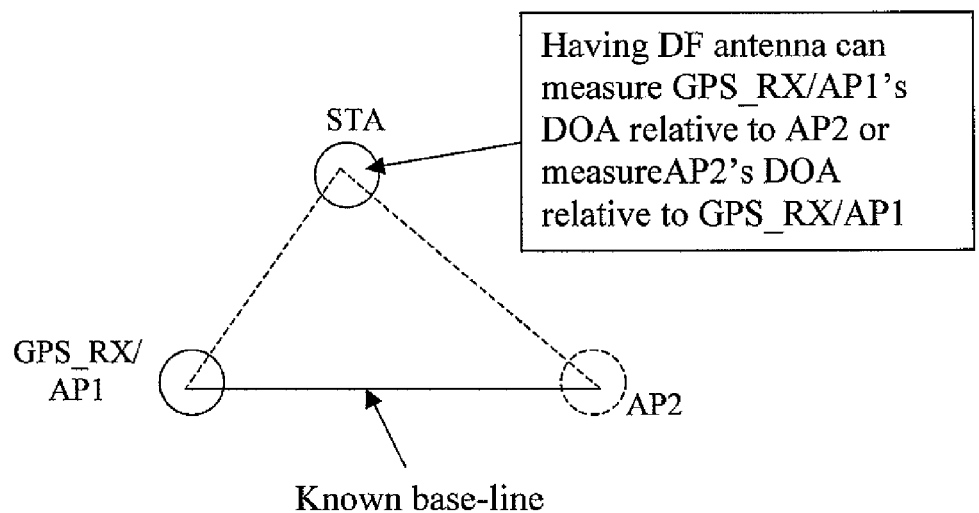

Alternatively, as shown in FIG. 4, the STA includes the DF antenna to measure the DOA of the GPS_RX/AP1 satellite (STA) relative to AP2, or measure the DOA of the AP2 relative to GPS_RX/AP1. At another hand, the GPS_RX/AP1 has DF antenna to measure the DOA of the satellite (STA) relative to AP2 to solve one difference and two equations of sine and cosine.

Figure 5A:
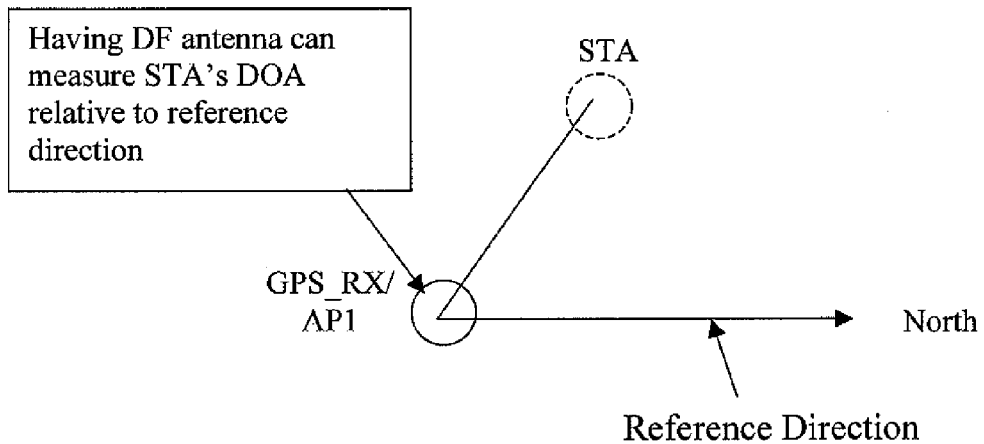
Figure 5B:
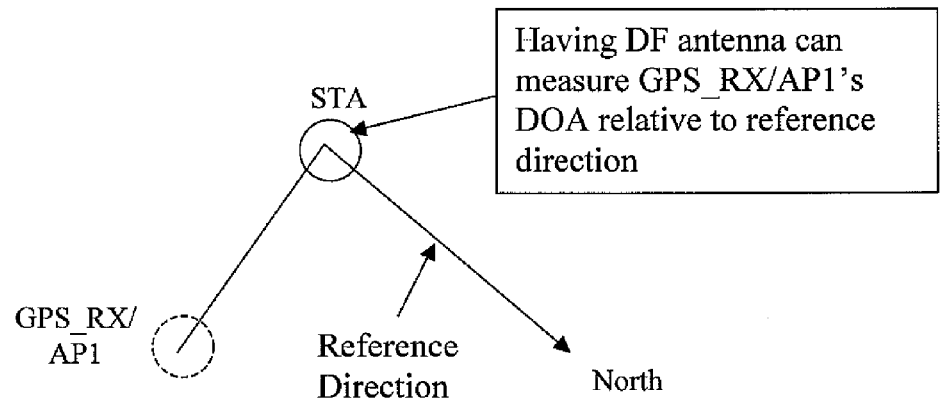

Another method can be used to estimate the position by single AP. Please see FIG. 5A, the GPS_RX AP1 with the DF antenna can measure the DOA of the satellite (STA) relative to a reference direction, for instance, north. Then, the AOA or TOA of the satellite relative to GPS_RX/AP1 can be measured. Similarly, if the satellite has the DF antenna, the STA may measure the AP1's DOA relative to a reference direction, and can measure the AP1's TOA or AOA relative to STA, as FIG. 5B.

Figure 6:
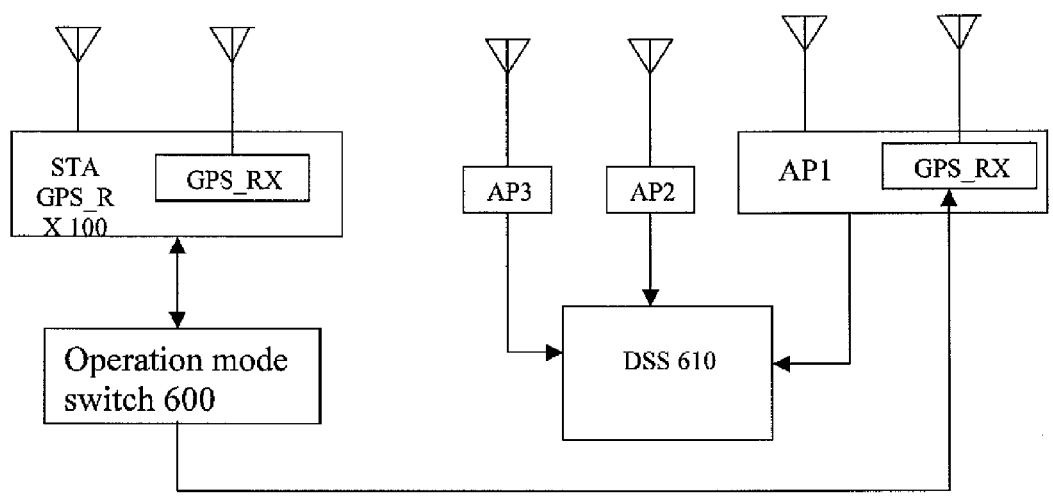
FIG. 6 shows a function diagram of the dual mode positioning system according to the present invention.

Turning to FIG. 6, it shows the function diagram according to the present invention. Each AP includes a CPU and an antenna for wireless network communication. Each of the CPU may process WPS positioning or joint GPS/WPS position search and is responsive to the request from the satellite. Each CPU is coupled to a DSS 610 to perform the WPS positioning service, WPS to GPS format transformation or joint GPS/WPS position library update. An operation mode switch 600 is coupled between the AP1 and the satellite GPS receiver 100 having satellite antenna to receive the satellite signal and a GPS receiver antenna. The CPU of the satellite UPS receiver 100 may process GPS positioning, Joint GPS&WPS position request to AP, Comparison and merge of GPS and Joint GPS&WPS positions), or Location-based service for navigation.

Figure 7:
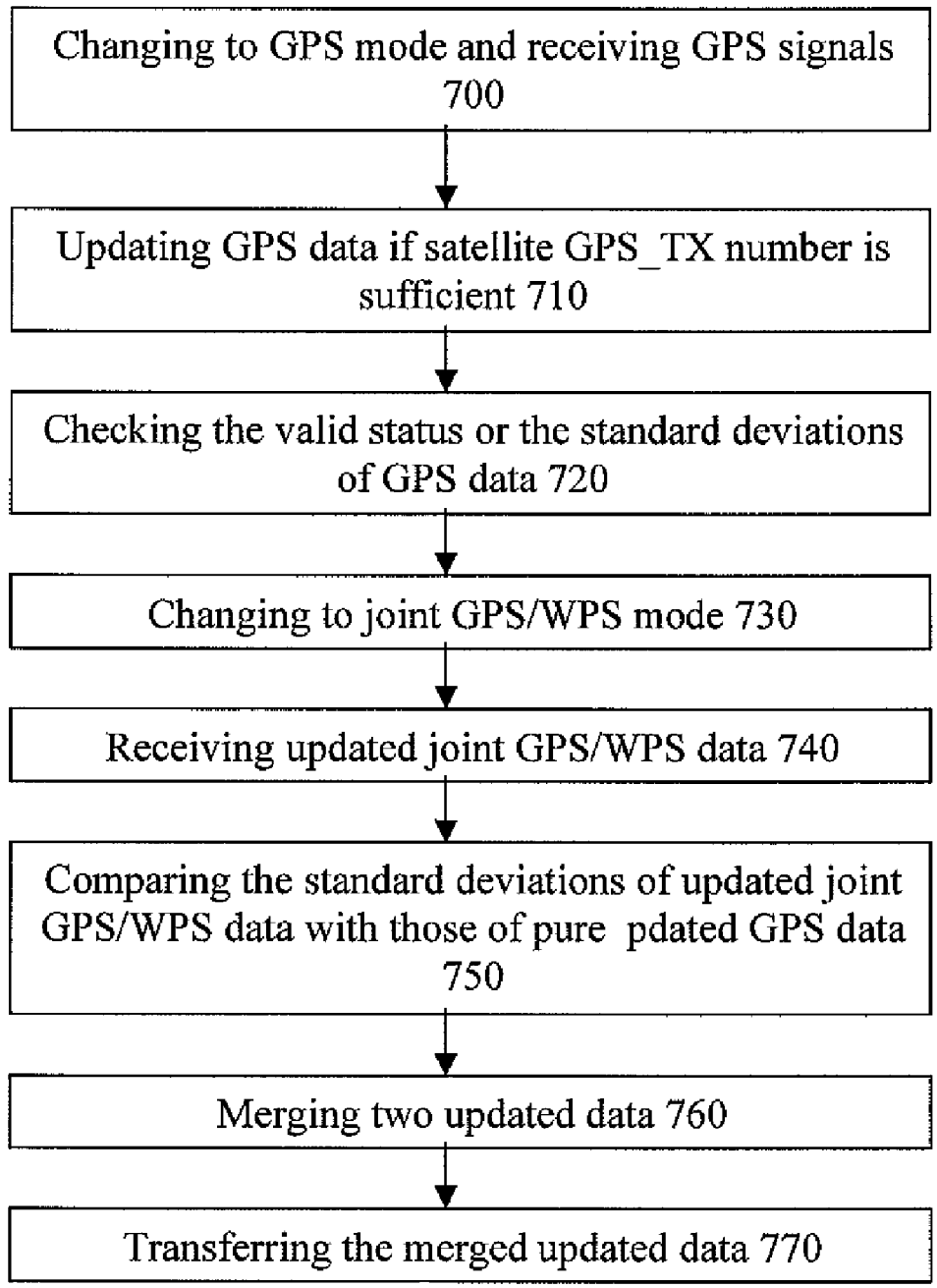
FIG. 7 shows a flow chart of operation method for a satellite side according to the present invention.

Turning to FIG. 7, it illustrates the flow of operating for satellite side according to the present invention. In step 700, the GPS_RX/STA changes the mode to UPS mode and tries receiving GPS signals from a sufficient number (greater than 3) of observable satellite GPS_TXs. Next, step 710, the GPS_Rx/STA perform the function of location positioning to update GPS data by analyzing received GPS signals if observable satellite GPS_TX number is sufficient (greater than 3). Otherwise, the GPS_RX/STA in step 720 checks the valid status or the standard deviations of GPS data and keeps doing location positioning if the status is valid or if the standard deviations are less than preset thresholds. Otherwise, in step 730, the GPS_RX/STA changes to joint GPS/WPS mode and send the request for updated joint GPS/WPS position to associated AP.

In step 740, GPS_RX/STA receives updated joint GPS/WPS data with standard deviations from associated AP. Subsequently, in 750, the GPS_RX/STA compares the standard deviations of updated joint GPS/WPS data with those of pure updated GPS data obtained by itself. Then, GPS_RX/STA merges two updated data by choosing the ones with better standard deviations in step 760. Finally, GPS_RX/STA transfers the merged updated data to any location-based service system of itself in step 770.

Figure 8:
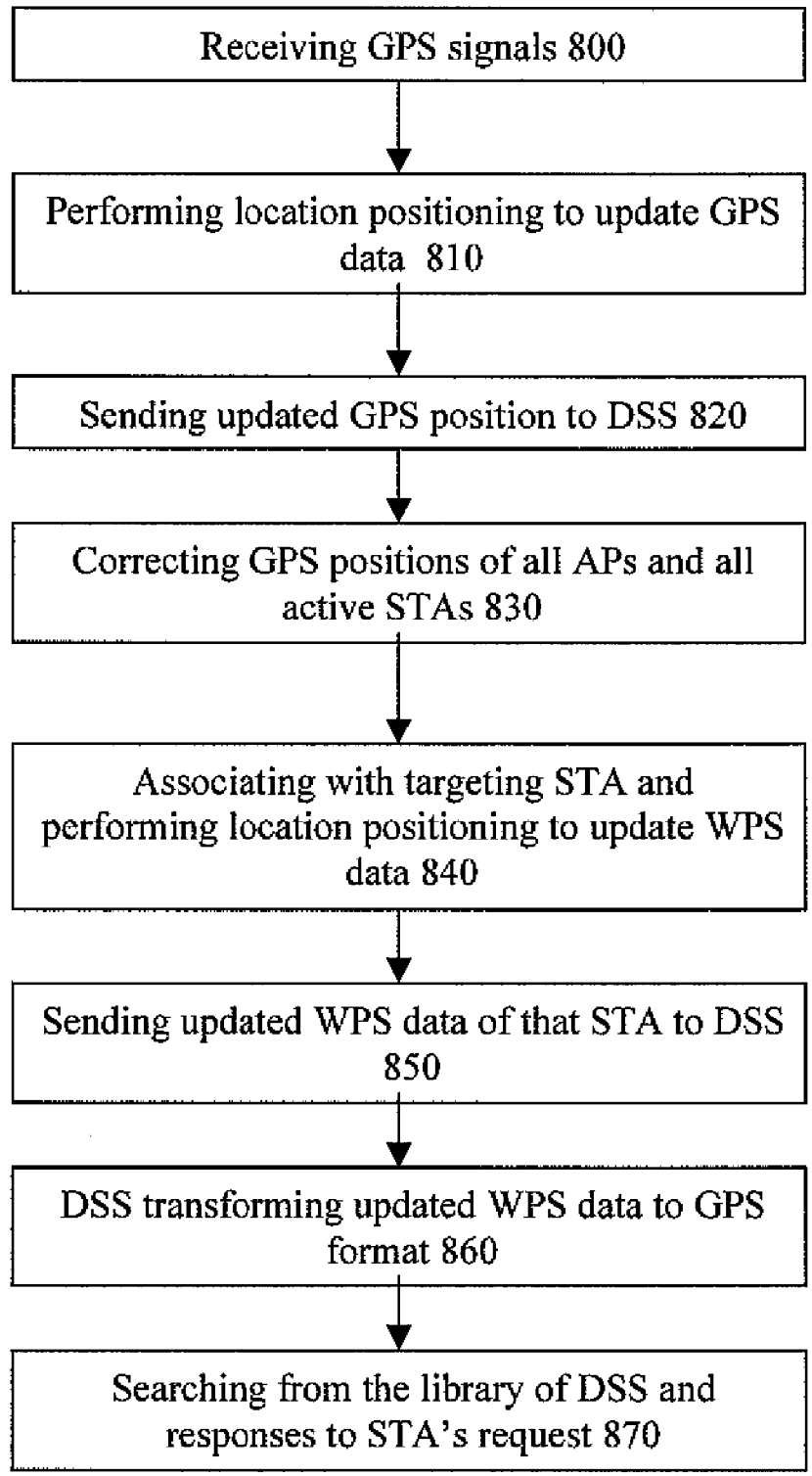
FIG. 8 shows a flow chart of operation method for an AP side according to the present invention.

Turning to FIG. 8, it illustrates the flow of operating for AP side according to the present invention. The method of operation a dual mode positioning system having multiple wireless network devices and a satellite UPS receiver coupled to a switch, wherein one of the multiple wireless network devices includes a GPS receiver (GPS_RX/AP), the method comprising a step of receiving GPS signals from a sufficient number of satellite GPS transmitter by the wireless network devices including a UPS receiver in step 800. The number of the satellite is greater than three, The next step 810 is that GPS_RX/AP does location positioning to update GPS data by analyzing received GPS signals. In 820, the GPS_RX/AP sends its updated GPS position to DSS that has the library of static positions of all APs and dynamic positions of all STAs, with same ESSID; the library includes the standard deviations of the date to be output.

Next, in step 830, DSS corrects the GPS positions of all APs and all active STAs. The following step 840 is to associate with targeting STA, a sufficient number of APs (may include GPS_RX/AP) perform location positioning to update WPS data of that STA by hyperbolic or elliptic positioning method. Alternative method could be used, for instance mandatory (or optional) triangulation method or single AP to STA positioning method.

One (may be GPS_RX/AP) of the positioning APs sends updated WPS data of that STA to DSS in step 850 and then the DSS transforms updated WPS data to UPS format and corrects the position of that STA based on updated GPS data in step 860. The subsequent step 870 is to Associate AP searches from the library of DSS and responses to STA's request for the updated joint GPS/WPS position.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

Having described the invention, the following is claimed:

1. A dual mode positioning system, comprising:
multiple network communication devices for performing WPS (wireless local-area network positioning system) positioning, one of said multiple network communication devices including a GPS (global positioning system) receiver;
DSS (distribution service system) coupled to said multiple network communication devices;
an operation mode switch coupled to said one of said multiple network communication devices including a GPS receiver; and
a satellite GPS receiver coupled to said operation mode switch.

2. The system of claim 1, wherein said satellite GPS receiver is operated in an indoor area confined by walls with wide FOV (field of view) glass window, said operation mode switch switching to GPS mode when said satellite GPS receiver receives signals from greater than 3 satellites.

3. The system of claim 1, wherein said satellite GPS receiver is operated in an indoor area confined by concrete walls or walls with narrow FOY glass window, said operation mode switch switching to Joint GPS/WPS mode when said satellite gPS receiver cannot receive signals from greater than 3 satellites.

4. The system of claim 3, wherein in said Joint GPS/WPS mode, said satellite GPS receiver may discard null or degraded GPS position data and replace it by Joint GPS/WPS position data or coordinate degraded GPS position data with Joint GPS/WPS position data in order to improve the accuracy of location positioning.

5. The system of claim 4, wherein said Joint GPS/WPS position data are obtained by correcting a WPS position data of said satellite GPS receiver relative to said one of said multiple network communication devices including GPS receiver with a known GPS position.

6. The system of claim 1, wherein said satellite GPS receiver includes a unit to perform the functions of GPS positioning and Joint GPS/WPS positioning for sending request to said multiple network communication devices, to compare and merge GPS and Joint GPS/ WPS positions or location-based service for navigation.

7. The system of claim 1, wherein said one of said network communication devices including a GPS receiver has a unit to perform the functions of GPS positioning, WPS positioning, and Joint GPS/WPS position searching and responding to request a satellite.

8. The system of claim 1, wherein said DSS performs the functions of WPS positioning, WPS to GPS format translating, and Joint GPS/WPS position library updating.

9. A method of operating a dual mode positioning system having multiple network communication devices for performing WPS (wireless local-area network positioning system) positioning and a satellite GPS (global positioning system) receiver coupled to a switch, wherein one of said multiple network communication devices includes a GPS receiver, said method comprising:
  switching to a GPS mode by said switch for satellite GPS receiver to receive signals from a number of satellites when said satellite GPS receiver is operated in an indoor area confined by walls with wide FOV (field of view) glass window; and
  switching to Joint GPS/WPS mode by said switch when said satellite GPS receiver cannot receive signals from said number of satellites when said satellite GPS receiver is operated in an indoor area confined by concrete walls or walls with narrow FOV glass window.

10. The system of claim 9, wherein in said Joint GPS/WPS mode, said satellite GPS receiver may discard null or degraded GPS position data and replace it by Joint GPS/WPS position data or coordinate degraded GPS position data with Joint GPS/WPS position data in order to improve the accuracy of location positioning.

11. The system of claim 10, wherein said Joint GPS/WPS position data is obtained by correcting a WPS position data of satellite GPS receiver relative to said one of said network communication devices including a GPS receiver.

12. A method of operating a dual mode positioning system having multiple network communication devices for performing WPS (wireless local-area network positioning system) positioning and a satellite GPS (global positioning system) receiver coupled to a switch, wherein one of said multiple network communication devices includes a GPS receiver, said method comprising:
  receiving GPS signals from a number of satellite GPS transmitters by said one of said network communication devices including a CPS receiver;
  performing location positioning to update GPS data by analyzing received GPS signals;
  sending updated GPS position to DSS (Distribution Service System) that has a library of static positions of said multiple network communication devices and dynamic positions of said satellite GPS receiver, wherein said DSS is coupled to said multiple network communication devices for performing said WPS positioning;
  correcting GPS positions of said multiple network communication devices and said satellite GPS receiver;
  associating with said satellite GPS receiver, said multiple network communication devices to perform location positioning to establish and update WPS data;
  sending updated WPS data of said satellite GPS receiver to said DSS; and
  transforming updated WPS data to (GPS format and correcting the position of said satellite GPS receiver based on said updated GPS data.

13. The method of claim 12, further comprising steps of searching from the library of said DSS and responding to satellite request for updated joint GPS/WPS position.

14. The method of claim 12, wherein the step of said location positioning to establish and update WPS data is implemented by hyperbolic or elliptic positioning method.

15. The method of claim 12, wherein the step of said location positioning to establish and update WPS data is implemented by mandatory triangulation method.

16. The method of claim 12, wherein the step of said location positioning to establish and update WPS data is implemented by single network communication device to satellite positioning method.

17. A method of operating a dual mode positioning system having multiple network communication devices for performing WPS (wireless local-area network positioning system) and a satellite GPS (global positioning system) receiver coupled to a switch, wherein one of said multiple network communication devices includes a GPS receiver, said method comprising:
  changing to a GPS mode and receiving OPS signals from a number of satellite GPS transmitters;
  updating GPS data by analyzing said received GPS signals if said satellite GPS transmitter number is sufficient, otherwise checking the valid status or the standard deviations of GPS data and performing location positioning if status is valid or if standard deviations are less than a plurality of thresholds;
  changing to a joint GPS/WPS mode and sending the request for updated joint GPS/WPS position to associated network communication device if said status is not valid or if said standard deviations are higher than said thresholds; and
  receiving updated joint GPS/WPS data with said standard deviations from said associated network communication device.

18. The method of claim 17 further comprising steps of:
  comparing said standard deviations of said updated joint GPS/WPS data with those of pure updated GPS data after receiving said updated joint GPS/WPS data;
  merging two updated data by choosing the ones with smaller standard deviations; and
  transferring said merged updated data to any location-based service system.

19. The method of claim 17, wherein said step of updating GPS data is performed by said satellite GPS receiver.

20. The method of claim 17, wherein the step of checking the valid status or the standard deviations of GPS data is performed by said satellite GPS receiver.

* * * * *

UNITED STATES PATENT AND TRADEMARK OFFICE
CERTIFICATE OF CORRECTION

PATENT NO. : 7,599,796 B2
APPLICATION NO. : 11/382833
DATED : October 6, 2009
INVENTOR(S) : Tsai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 703 days.

Signed and Sealed this

Twenty-eighth Day of September, 2010

David J. Kappos
*Director of the United States Patent and Trademark Office*